United States Patent
Wu et al.

(10) Patent No.: US 9,268,192 B2
(45) Date of Patent: Feb. 23, 2016

(54) ELECTROPHORETIC DISPLAY APPARATUS

(71) Applicant: E Ink Holdings Inc., Hsinchu (TW)

(72) Inventors: Chi-Ming Wu, Hsinchu (TW); Shu-Hao Chang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 110 days.

(21) Appl. No.: 14/045,795

(22) Filed: Oct. 4, 2013

(65) Prior Publication Data

US 2014/0192402 A1    Jul. 10, 2014

(30) Foreign Application Priority Data

Jan. 9, 2013  (TW) .............................. 102100740 A

(51) Int. Cl.
- *G02B 26/00* (2006.01)
- *G02F 1/167* (2006.01)
- *G02F 1/17* (2006.01)
- *G02F 1/1345* (2006.01)

(52) U.S. Cl.
CPC ................ *G02F 1/167* (2013.01); *G02F 1/172* (2013.01); *G02F 1/13452* (2013.01); *G02F 2202/28* (2013.01)

(58) Field of Classification Search
CPC .. G09G 3/344; G09G 2310/068; G02F 1/167; G02F 2001/1672; G02F 2001/1676; G02F 2001/1678; G02F 1/13452; G02F 2202/28
USPC ........................................................ 359/296
See application file for complete search history.

(56) References Cited

U.S. PATENT DOCUMENTS

| | | | |
|---|---|---|---|
| 2010/0177032 A1* | 7/2010 | Yamada | 345/107 |
| 2012/0146975 A1* | 6/2012 | de Zeeuw et al. | 345/211 |
| 2012/0287175 A1* | 11/2012 | Yamada | 345/690 |

* cited by examiner

*Primary Examiner* — David N Spector
*Assistant Examiner* — Grant Gagnon
(74) *Attorney, Agent, or Firm* — Jianq Chyun IP Office

(57) ABSTRACT

An electrophoretic display apparatus is suitable for being electrically connected to an external circuit and includes a drive array substrate, an electrophoretic display film and a first optical adhesive layer. The electrophoretic display film is disposed on the drive array substrate and includes a flexible substrate and a display medium layer. The flexible substrate has a disposed region and a bonding region. The external circuit is disposed between the flexible substrate and the drive array substrate, located in the bonding region and extends outside the drive array substrate. The display medium layer is disposed between the flexible substrate and the drive array substrate and located in the disposed region. The first optical adhesive layer is disposed between the display medium layer and the drive array substrate. A thickness of the external circuit is substantially a sum of that of the display medium layer and the first optical adhesive layer.

10 Claims, 4 Drawing Sheets

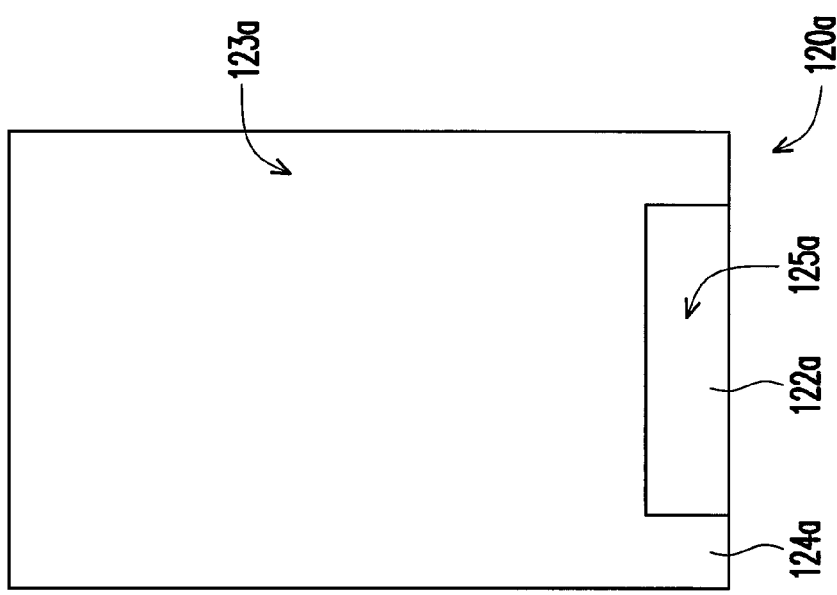

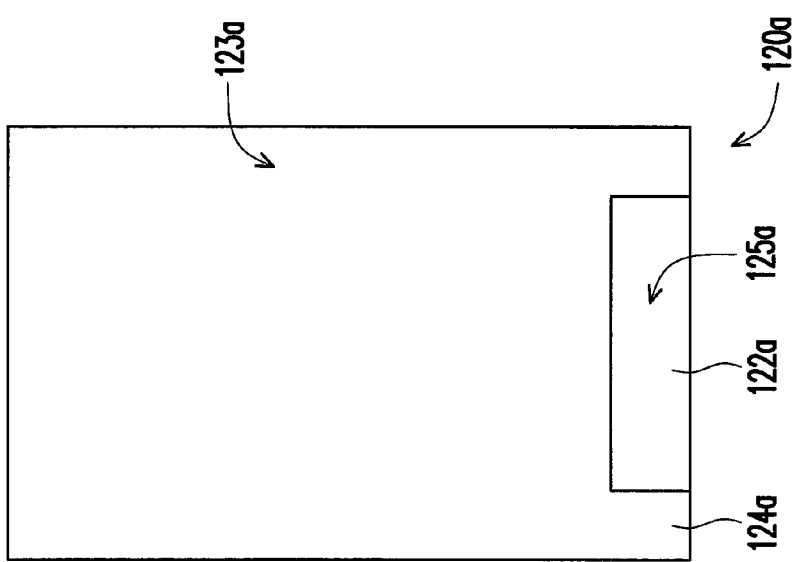

ELECTROPHORETIC DISPLAY APPARATUS

CROSS-REFERENCE TO RELATED APPLICATION

This application claims the priority benefit of Taiwan application serial no. 102100740, filed on Jan. 9, 2013. The entirety of the above-mentioned patent application is hereby incorporated by reference herein and made a part of this specification.

BACKGROUND OF THE INVENTION

1. Field of the Invention

The present invention relates to a display apparatus, and more particularly, to an electrophoretic display apparatus.

2. Description of Related Art

In recent years, since various display techniques continue to flourish, after ceaselessly researching and developing, many display products such as electrophoretic display, liquid crystal display (LCD), plasma display, organic light-emitting diode display (OLED display), and the like, have been gradually commercialized and applied in display apparatuses with various sizes and areas. With the growing popularity of the portable electronic products, flexible displays such as electronic paper (e-paper), electronic book (e-book), and so on, have been gradually attractive to the customers on the market.

In general, the e-paper and the e-book are based on electrophoretic display technique for the display purpose. Current technology provides an electrophoretic display apparatus consisting of a front plane laminate (FPL), a thin-film transistor (TFT) array substrate and a display medium layer disposed between the FPL and the TFT array substrate. When the electrophoretic display apparatus is electrically connected to other electronic apparatuses through an external circuit, the external circuit is inserted between a portion of the display medium layer and a portion of the TFT array substrate. Meanwhile, the inserting of the external circuit may cause the electrophoretic display apparatus to produce an uneven surface phenomenon on the overall structure, namely, the place where the external circuit is inserted protrudes upwardly. In addition, in the proceeding filling process of the encapsulant for encapsulating the display medium and the side walls of TFT array substrate, bubbles may occur due to the protrusion, i.e., since a gap is generated between the display medium layer and the external circuit, the reliability of the overall structure of the electrophoresis display apparatus is affected.

SUMMARY OF THE INVENTION

The present invention further provides an electrophoretic display apparatus which has better surface flatness and structure reliability.

The present invention provides an electrophoretic display apparatus suitable for electrically connecting with an external circuit. The electrophoretic display apparatus includes a drive array substrate, an electrophoretic display film and a first optical adhesive layer. The electrophoretic display film is disposed on the drive array substrate. The electrophoretic display film includes a flexible substrate and a display medium layer. The flexible substrate has a disposed region and a bonding region, wherein the disposed region surrounds the bonding region, the external circuit is disposed between the flexible substrate and the drive array substrate, and the external circuit is located in the bonding region and extends outside the drive array substrate. The display medium layer is disposed between the flexible substrate and the drive array substrate and located in the disposed region. The first optical adhesive layer is disposed between the display medium layer and the drive array substrate. The thickness of the external circuit is substantially the sum of the thickness of the display medium layer and the thickness of the first optical adhesive layer.

According to an exemplary embodiment of the present invention, the external circuit is a chip on film type external circuit.

According to an exemplary embodiment of the present invention, the electrophoretic display film has at least one opening, wherein the opening exposes a portion of the drive array substrate and the disposed region and the bonding region surround the opening. At least one chip is adapted to disposing on the drive array substrate exposed by the opening, and the thickness of the chip is substantially the sum of the thickness of the electrophoretic display film and the thickness of the first optical adhesive layer.

According to one exemplary embodiment of the present invention, the external circuit is a flexible printed circuit board.

According to one exemplary embodiment of the present invention, the electrophoretic display apparatus further includes a filling material disposed between the chip and the opening and the filling material fills up the gap between the chip and the opening.

According to an exemplary embodiment of the present invention, the drive array substrate includes an active array substrate or a passive array substrate.

According to an exemplary embodiment of the present invention, the electrophoretic display apparatus further includes a first protecting layer and a second protecting layer. The first protecting layer is disposed on the electrophoretic display film. The second protecting layer is disposed on the drive array substrate, wherein the electrophoretic display film and the drive array substrate are located between the first protecting layer and the second protecting layer.

According to an exemplary embodiment of the present invention, the electrophoretic display apparatus further includes a second optical adhesive layer and a third optical adhesive layer. The second optical adhesive layer is disposed between the electrophoretic display film and the first protecting layer. The third optical adhesive layer is disposed between the drive array substrate and the second protecting layer.

According to an exemplary embodiment of the present invention, the display medium layer includes a plurality of display mediums, and each of the display mediums includes an electrophoretic solution and a plurality of charged particles distributed in the electrophoretic solution.

According to an exemplary embodiment of the present invention, the display medium layer includes a plurality of display mediums, and each of the display mediums includes an electrophoretic solution, a plurality of charged particles distributed in the electrophoretic solution and a microcup. The microcup is disposed on the flexible substrate and interconnected with the first optical adhesive layer so that the electrophoretic solution and the charged particles are sealed within the microcup.

In light of the above, since the external circuit is disposed between the flexible substrate of the electrophoretic display film and the drive array substrate, and the thickness of the external circuit is substantially the sum of the thickness of the display medium layer and the thickness of the first optical adhesive layer, the electrophoretic display apparatus of the present invention has a better surface flatness. Furthermore, since the electrophoretic display apparatus of the present invention has a better surface flatness, the decrease of structure reliability because of the generating of bubbles during encapsulating due to the height difference between the external circuit and the electrophoretic display film in the related art can be avoided. In other words, the electrophoretic display apparatus of the present invention has a better structure reliability.

In order to make the aforementioned and other features and advantages of the invention more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 1B is a top view schematically illustrating an electrophoretic display film of the electrophoretic display apparatus depicted in FIG. 1A.

FIG. 2B is a top view schematically illustrating an electrophoretic display film of the electrophoretic display apparatus depicted in FIG. 2A.

DESCRIPTION OF EMBODIMENTS

Figure 1A:
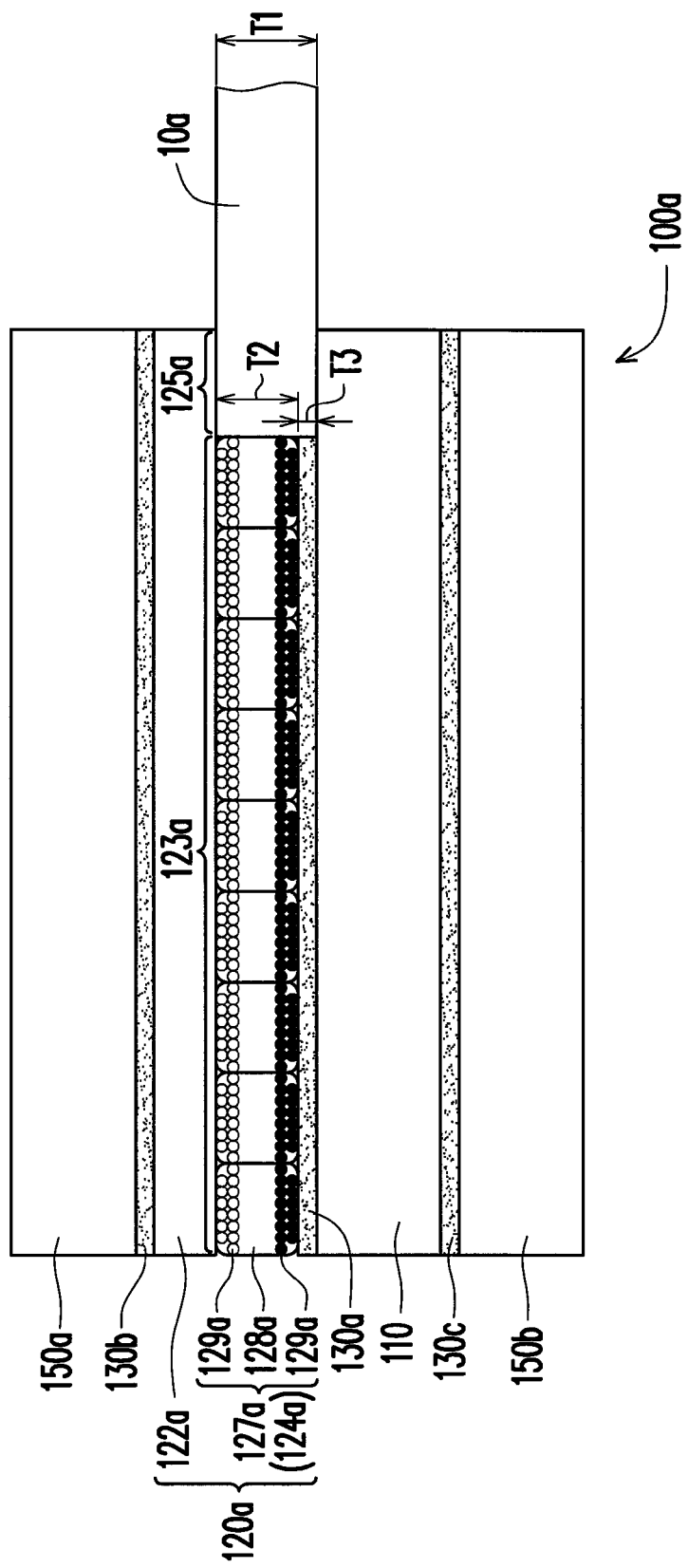
FIG. 1A is a schematic cross-sectional view of an electrophoretic display apparatus according to an exemplary embodiment of the present invention.

FIG. 1A is a schematic cross-sectional view of an electrophoretic display apparatus according to an exemplary embodiment of the present invention. FIG. 1B is a top view schematically illustrating an electrophoretic display film of the electrophoretic display apparatus depicted in FIG. 1A. Referring to FIG. 1A and FIG. 1B, the electrophoretic display apparatus 100a of the embodiment is suitable for electrically connecting with an external circuit 10a. The electrophoretic display apparatus 100a includes a drive array substrate 110, an electrophoretic display film 120a and a first optical adhesive layer 130a. The electrophoretic display film 120a is disposed on the drive array substrate 110. The electrophoretic display film 120a includes a flexible substrate 122a and a display medium layer 124a. The flexible substrate 122a has a disposed region 123a and a bonding region 125a, wherein the disposed region 123a surrounds the bonding region 125a. The external circuit 10a is disposed between the flexible substrate 122a and the drive array substrate 110. The external circuit 10a is located in the bonding region 125a of the flexible substrate 122a and extends outside the drive array substrate 110. The display medium layer 124a is disposed between the flexible substrate 122a and the drive array substrate 110 and located in the disposed region 123a. The first optical adhesive layer 130a is disposed between the display medium layer 124a and the drive array substrate 110. Particularly, the thickness T1 of the external circuit 10a is substantially the sum of the thickness T2 of the display medium layer 124a and the thickness T3 of the first optical adhesive layer 130a.

In more detail, the drive array substrate 110 of the embodiment is an active array substrate or a passive array substrate, for example, but the present invention is not limited thereto. The drive array substrate 110 is for driving the display medium layer 124a in the electrophoretic display film 120a. The display medium layer 124a of the embodiment includes a plurality of display mediums 127a, wherein each of the display mediums 127a includes an electrophoretic solution 128a and a plurality of charged particles 129a distributed in the electrophoretic solution 128a. Briefly, the display medium 127a in the embodiment is a microcapsule structure, for example. In addition, a material of the flexible substrate 122a is poly-ethylene tetrephthalate (PET), for example. The external circuit 10a is a chip on film type external circuit, for example.

In order to achieve a better structural strength, the electrophoretic display apparatus 100a of the embodiment further includes a first protecting layer 150a and a second protecting layer 150b. The first protecting layer 150a is disposed on the electrophoretic display film 120a. The second protecting layer 150b is disposed on the drive array substrate 110, wherein the electrophoretic display film 120a and the drive array substrate 110 are located between the first protecting layer 150a and the second protecting layer 150b. Moreover, the electrophoretic display apparatus 100a of the embodiment further includes a second optical adhesive layer 130b and a third optical adhesive layer 130c. The second optical adhesive layer 130b is disposed between the electrophoretic display film 120a and the first protecting layer 150a, so as to fix the first protecting layer 150a onto the electrophoretic display film 120a. The third optical adhesive layer 130c is disposed between the drive array substrate 110 and the second protecting layer 150b, so as to fix the second protecting layer 150b onto the drive array substrate 110.

In the embodiment, the display medium layer 124a is not disposed in the bonding region 125a of the flexible substrate 122a, namely, the display medium layer 124a is merely disposed in the disposed region 123a of the flexible substrate 122a. Therefore, if the external circuit 10a is disposed between the bonding region 125a of the flexible substrate 122a and the drive array substrate 110, since the thickness T1 of the external circuit 10a is substantially the sum of the thickness T2 of the display medium layer 124a and the thickness T3 of the first optical adhesive layer 130a, the overall electrophoretic display apparatus 100a may have a better surface flatness. Furthermore, since the thickness T1 of the external circuit 10a is substantially the sum of the thickness T2 of the display medium layer 124a and the thickness T3 of the first optical adhesive layer 130a, in the proceeding filling process of the encapsulant (not shown) for encapsulating the display medium layer 124a and the side walls of the drive array substrate 110, the decrease of structure reliability because of the generating of bubbles during encapsulating due to the height difference between the external circuit and the electrophoretic display film in the related art can be avoided. In other words, the electrophoretic display apparatus 100a of the embodiment may also have a better structure reliability.

It should be mentioned that the structure and configuration of the display medium layer 124a and the external circuit 10a are not limited in the present invention, although the display medium layer 124a mentioned herein substantially consists of a plurality of microcapsule structures of display mediums 127a and the external circuit 10a is specifically a chip on film type external circuit. However, other known structure and configuration which can achieve the same effect of displaying and electrical connection is still a part of the technical proposal of the present invention and does not depart from the protection scope of the invention.

Figure 2A:
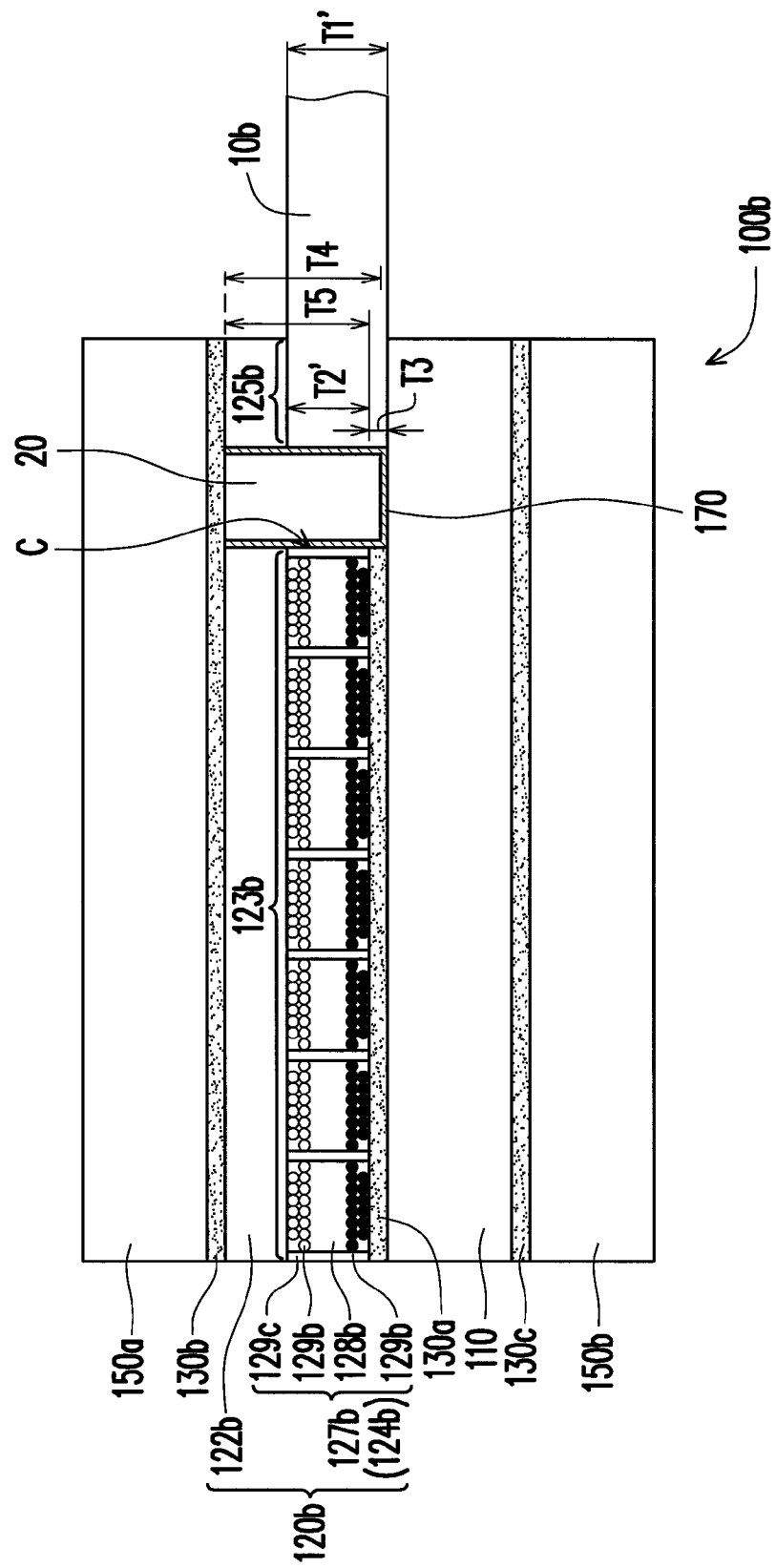
FIG. 2A is a schematic cross-sectional view of an electrophoretic display apparatus according to another exemplary embodiment of the present invention.

For example, referring to FIG. 2A and FIG. 2B, wherein FIG. 2A is a schematic cross-sectional view of an electrophoretic display apparatus according to another exemplary embodiment of the present invention, and FIG. 2B is a top view schematically illustrating an electrophoretic display film of the electrophoretic display apparatus depicted in FIG. 2A. It should be noted that reference numerals the same as that of the above embodiment are used in this embodiment to indicate similar components, and other features of the relevant technology will not be repeated herein. The relevant description which is not repeated can be referred to the foregoing embodiment and detailed description is not repeated herein.

As shown in FIG. 2A and FIG. 2B, the main difference between the electrophoretic display apparatus 100b of this embodiment and the electrophoretic display apparatus 100a of the above embodiment is: the electrophoretic display film 120b of the electrophoretic display apparatus 100b of this embodiment has at least one opening C (merely one opening is schematically shown). The opening C exposes a portion of the drive array substrate 110 and the disposed region 123b and the bonding region 125b of the flexible substrate 122b surround the opening C. At least one chip 20 is adapted to disposing on the drive array substrate 110 exposed by the opening C, and the thickness T4 of the chip 20 is substantially the sum of the thickness T5 of the electrophoretic display film 120b and the thickness T3 of the first optical adhesive layer 130a. Herein, the chip 20 is directly contact with the drive array substrate 110 and the structure is generally called chip on glass (COG). The chip 20 is a drive chip for driving the drive array substrate 110, for example. In addition, the electrophoretic display apparatus 100b of the embodiment further includes a filling material 170, wherein the filling material 170 is disposed between the chip 20 and the opening C and the filling material 170 fills up the gap between the chip 20 and the opening C so as to fix the chip 20 within the opening C.

Additionally, the display medium layer 124b of the electrophoretic display film 120b includes a plurality of display mediums 127b. Each of the display mediums 127b includes an electrophoretic solution 128b, a plurality of charged particles 129b distributed in the electrophoretic solution 128b and a microcup 129c. The microcup 129c is disposed on the flexible substrate 122b and interconnected with the first optical adhesive layer 130a so that the electrophoretic solution 128b and the charged particles 129b are sealed within the microcup 129c. Briefly, the display medium 127b in the embodiment is a microcup structure, for example. Certainly, in other embodiments which are not shown in the figures, the display medium 127a having the microcapsule structure as mentioned above can also be used, and those skilled in the art can also select the aforementioned components with reference of aforementioned descriptions according to actual requirements so as to achieve required technical effects. In addition, the external circuit 10b herein is a flexible printed circuit board, for example.

Since the electrophoretic thin film 120b has an opening C for accommodating the chip 20 and the thickness T4 of the chip 20 is substantially the sum of the thickness T5 of the electrophoretic thin film 120b and the thickness T3 of the first optical adhesive layer 130a, the overall electrophoretic display apparatus 100b may have a better surface flatness. Furthermore, since the thickness T1' of the external circuit 10b is substantially the sum of the thickness T2' of the display medium layer 124b and the thickness T3 of the first optical adhesive layer 130a, in the proceeding filling process of the encapsulant (not shown) for encapsulating the display medium layer 124b and the side walls of the drive array substrate 110, the decrease of structure reliability because of the generating of bubbles during encapsulating due to the height difference between the external circuit and the electrophoretic display film in the related art can be avoided. In other words, the electrophoretic display apparatus 100b of the embodiment may also have a better structure reliability.

In light of the foregoing, since the external circuit is disposed between the flexible substrate of the electrophoretic display film and the drive array substrate, and the thickness of the external circuit is substantially the sum of the thickness of the display medium layer and the thickness of the first optical adhesive layer, the electrophoretic display apparatus of the present invention has a better surface flatness. Furthermore, since the electrophoretic display apparatus of the present invention has a better surface flatness, the decrease of structure reliability because of the generating of bubbles during encapsulating due to the height difference between the external circuit and the electrophoretic display film in the related art can be avoided. In other words, the electrophoretic display apparatus of the present invention has a better structure reliability.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An electrophoretic display apparatus suitable for electrically connecting with an external circuit, the electrophoretic display apparatus comprising:
   a drive array substrate;
   an electrophoretic display film disposed on the drive array substrate, the electrophoretic display film comprising:
      a flexible substrate having a disposed region and a bonding region, wherein the disposed region surrounds the bonding region, the external circuit is disposed between the flexible substrate and the drive array substrate, and the external circuit is located in the bonding region and extends outside the drive array substrate; and
      a display medium layer disposed between the flexible substrate and the drive array substrate and located in the disposed region, and
   a first optical adhesive layer disposed between the display medium layer and the drive array substrate, wherein a thickness of the external circuit is substantially a sum of a thickness of the medium layer and a thickness of the first optical adhesive layer.

2. The electrophoretic display apparatus as claimed in claim 1, wherein the external circuit is a chip on film type external circuit.

3. The electrophoretic display apparatus as claimed in claim 1, wherein the drive array substrate comprises an active array substrate or a passive array substrate.

4. The electrophoretic display apparatus as claimed in claim 1, wherein the display medium layer comprises a plurality of display mediums, each of the display mediums comprises an electrophoretic solution and a plurality of charged particles distributed in the electrophoretic solution.

5. The electrophoretic display apparatus as claimed in claim 1, wherein the display medium layer comprises a plurality of display mediums, each of the display mediums comprises an electrophoretic solution, a plurality of charged particles distributed in the electrophoretic solution and a microcup, the microcup is disposed on the flexible substrate and interconnected with the first optical adhesive layer so that the electrophoretic solution and the charged particles are sealed within the microcup.

6. The electrophoretic display apparatus as claimed in claim 1, further comprising:
   a first protecting layer disposed on the electrophoretic display film; and
   a second protecting layer disposed on the drive array substrate, wherein the electrophoretic display film and the drive array substrate are located between the first protecting layer and the second protecting layer.

7. The electrophoretic display apparatus as claimed in claim 6, further comprising:
   a second optical adhesive layer disposed between the electrophoretic display film and the first protecting layer; and
   a third optical adhesive layer disposed between the drive array substrate and the second protecting layer.

8. The electrophoretic display apparatus as claimed in claim 1, wherein the electrophoretic display film has at least one opening, the at least one opening exposes a portion of the drive array substrate, the disposed region and the bonding region surround the opening, at least one chip is adapted to disposing on the drive array substrate exposed by the opening, and a thickness of the chip is substantially a sum of a thickness of the electrophoretic display film and a thickness of the first optical adhesive layer.

9. The electrophoretic display apparatus as claimed in claim 8, wherein the external circuit is a flexible printed circuit board.

10. The electrophoretic display apparatus as claimed in claim 8, further comprising a filling material disposed between the chip and the at least one opening and the filling material filling up a gap between the chip and the at least one opening.

* * * * *